UNITED STATES PATENT OFFICE.

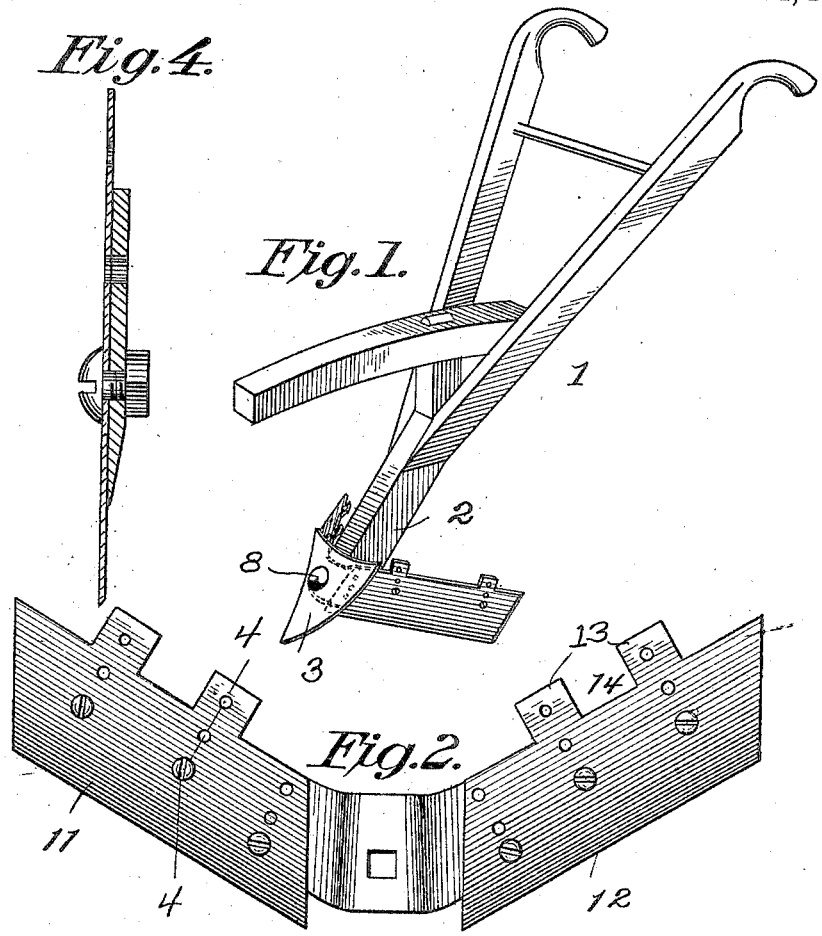
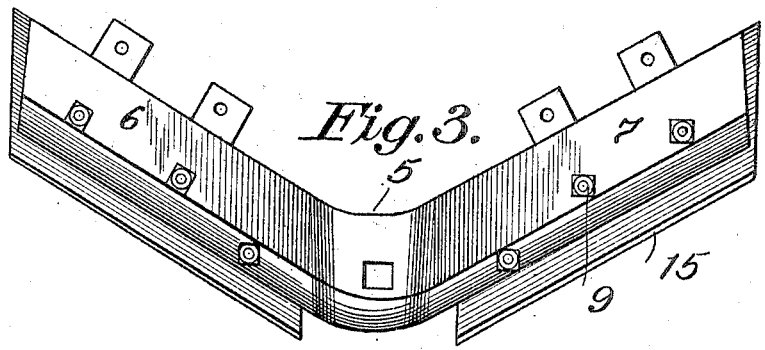

SAMUEL B. EVANS, OF KINARDS, SOUTH CAROLINA.

PLOW ATTACHMENT.

948,210.  Specification of Letters Patent.  Patented Feb. 1, 1910.

Application filed September 21, 1909.  Serial No. 518,749.

*To all whom it may concern:*

Be it known that I, SAMUEL B. EVANS, a citizen of the United States, residing at Kinards, in the county of Newberry and State of South Carolina, have invented new and useful Improvements in Plow Attachments, of which the following is a specification.

This invention relates to plow attachments of the class known as "heel-scrapers" and is designed to be mounted upon the rear side of the foot or standards of the plow which it follows, producing a "sweep" by which is meant the leveling of the edge of the furrow and the loosening of the ground for a considerable distance to each side thereof.

The object of the present invention is to provide a sweep or heel scraper which may be readily adjusted to cause it to assume various angular positions for "skinning" or "digging" as required.

A further object is to so construct and arrange the sides of the sweeps with adjustable cutting blades which are practically self-sharpened, which may be adjusted to any desired angle in relation to the arms of the sweep and which may be easily removed from the sweep when desired, so that when the sweep is once attached to the plow beam it may remain a permanent part thereof.

In the accompanying drawings I have illustrated a simple and preferred embodiment of the improvements, and in which:—

Figure 1 is a perspective view illustrating the device in its applied position upon a plow. Fig. 2 is a front elevation of the sweep. Fig. 3 is a rear elevation of the sweep. Fig. 4 is a vertical sectional view upon the line 4—4 of Fig. 2.

Referring to the drawings the numeral 1 designates a plow of any desired or ordinary type being provided with the standard 2 upon which is secured the customary point 3.

The numeral 4 designates the improved sweep. This sweep 4 is provided with a substantially straight face portion 5 from which diverge in opposite directions the inclined arms 6 and 7. It will be noted that the central portion of face 5 of the sweep is so constructed as to fit snugly against the standard 2 of the plow 1 and the said face is provided with a non-circular opening adapted for the reception of a non-circular portion of a bolt 8, whereby the sweep is attached to the said standard 2.

By reference to Fig. 3 of the drawings it will be noted that the lower edges of the sweep 4 are beveled to provide cutting portions. The arms 6 and 7 of the sweep are also provided with a plurality of openings which are arranged in staggered relation with each other and each are adapted for the reception of suitable removable retaining elements 9 whereby cutting plates 11 and 12 may be secured upon arms of the sweep 4. These plates 11 and 12 are also provided with a plurality of staggered openings so that the side plates may be readily adjusted in any desired position upon the arms 6 and 7, and the plates 11 and 12 have their upper edges provided with spaced ears 13 also having openings 14 which are likewise adapted to be engaged by the securing elements 9.

The lower edges of the plates 12 are sharpened as designated by the numeral 15, and from the foregoing description taken in connection with the accompanying drawings it will be noted that the said sharpened edges will readily sever roots or vegetation within the path of the sweep.

Having thus described the invention, what is claimed is—

A sweep comprising a substantially straightened body portion provided with integrally formed diverging inclined arms, said arms being provided with a plurality of staggered openings, cutting plates having sharpened lower edges and their upper edges provided with spaced ears for the arms, said plates being also provided with a plurality of openings, one series of which being adapted to be brought into alinement with the openings upon the arms of the sweep, and removable securing elements for the plates and arms of the sweep.

In testimony whereof I affix my signature in presence of two witnesses.

SAMUEL B. EVANS.

Witnesses:
 A. C. THOMASON,
 J. B. HUNTER.